(12) United States Patent
Bataillou et al.

(10) Patent No.: US 9,081,251 B2
(45) Date of Patent: Jul. 14, 2015

(54) DISPLAY DEVICE

(75) Inventors: Benoit Bataillou, Lyons (FR); Radu Surdeanu, Roosbeek (BE); Pascal Bancken, Opwijk (BE); David van Steenwinckel, Holsbeek (BE); Viet Nguyen Hoang, Leuven (BE)

(73) Assignee: NXP B.V., Eindhoven (NL)

( * ) Notice: Subject to any disclaimer, the term of this patent is extended or adjusted under 35 U.S.C. 154(b) by 354 days.

(21) Appl. No.: 13/056,116

(22) PCT Filed: Jul. 27, 2009

(86) PCT No.: PCT/IB2009/053264
§ 371 (c)(1),
(2), (4) Date: May 13, 2011

(87) PCT Pub. No.: WO2010/013193
PCT Pub. Date: Feb. 4, 2010

(65) Prior Publication Data
US 2012/0105311 A1    May 3, 2012

(30) Foreign Application Priority Data
Jul. 31, 2008 (EP) .................................. 08104927

(51) Int. Cl.
*G02F 1/19* (2006.01)
*G02F 1/23* (2006.01)

(52) U.S. Cl.
CPC .. *G02F 1/19* (2013.01); *G02F 1/23* (2013.01); *G02F 2203/10* (2013.01); *G09G 2300/00* (2013.01)

(58) Field of Classification Search
None
See application file for complete search history.

(56) References Cited

U.S. PATENT DOCUMENTS

| 5,499,037 | A | 3/1996 | Nakagawa et al. | |
|---|---|---|---|---|
| 6,819,469 | B1 * | 11/2004 | Koba | 359/290 |
| 8,009,356 | B1 * | 8/2011 | Shaner et al. | 359/573 |
| 2003/0020672 | A1 | 1/2003 | Takatori | |
| 2007/0096087 | A1 | 5/2007 | Catrysse et al. | |
| 2008/0024873 | A1 * | 1/2008 | Kim et al. | 359/642 |
| 2010/0046060 | A1 * | 2/2010 | Lee et al. | 359/277 |
| 2010/0220377 | A1 * | 9/2010 | Yamada et al. | 359/241 |

FOREIGN PATENT DOCUMENTS

| EP | 0 992 833 A2 | 4/2000 |
|---|---|---|
| EP | 1 808 728 A1 | 7/2007 |
| EP | 1 860 485 A1 | 11/2007 |
| WO | 99/61897 A1 | 12/1999 |

OTHER PUBLICATIONS

C. Genet, Light in Tiny Holes, Jan. 2007.*

(Continued)

*Primary Examiner* — Quan-Zhen Wang
*Assistant Examiner* — Chad Dicke

(57) ABSTRACT

A display device comprises a substrate which carries an array of pixels. Each pixel comprises an array of apertures in the substrate, each aperture of the array having a maximum opening dimension less than the wavelength of the light to be transmitted through the aperture. The effective dielectric constant of the aperture and/or the dielectric constant of the substrate is varied, thereby to vary the light transmission characteristics of the pixel between transmission of at least one frequency in the visible spectrum and transmission of substantially no frequency in the visible spectrum.

17 Claims, 2 Drawing Sheets

(56) References Cited

OTHER PUBLICATIONS

Light in Tiny Holes, C. Genet.*
Kim, T-J., et al. "Control of Optical Transmission Through Metals Perforated with Subwavelength Hole Arrays," Optics Letters, vol. 24, No. 4, pp. 256-258, (Feb. 15, 1999).

International Search Report and Written Opinion for International Patent Application PCT/IB2009/053264 (Dec. 11, 2009).
Genet, C., et al. "Light in Tiny Holes," Nature, vol. 445, pp. 39-46, (Jan. 4, 2007).

* cited by examiner

DISPLAY DEVICE

This invention relates to display devices.

There are many different display technologies. Different technologies are suitable for different applications, and generally the aim is to enable high resolution and contrast to be combined with low power consumption.

Display devices typically use a pixelated structure to modulate a light source, or to control a level of reflection. Colour filters are typically used to provide different colour sub-pixels. Current display devices thus operate using controlled degrees of reflection or transmission, combined with colour filtering operations.

Recently, the possibility of using quantum effects within display devices has been considered. US 2003/0020672 discloses the use of surface plasmon effects in a display device.

The invention is directed to display devices which make use of plasmon effects.

According to the invention, there is provided a display device comprising:

a substrate;

an array of pixels, each pixel comprising an array of apertures in the substrate, each aperture of the array having a maximum opening dimension less than the wavelength of the light to be transmitted by the aperture;

means for varying the effective dielectric constant of the aperture and/or the effective dielectric constant of the substrate, thereby to vary the light transmission characteristics of the pixel between transmission of at least one frequency in the visible spectrum and transmission of substantially no frequency in the visible spectrum.

This arrangement provides a pixel which is switchable between transmission (of a particular wavelength of light) and no visible transmission. No colour filters are required to provide the desired output colour, as the plasmon effect provides wavelength selection.

The use of arrays of sub-wavelength apertures means that a very high resolution screen can be obtained. Furthermore, the device can be used in a reflective mode (avoiding the need for backlighting) or a transmissive mode. The light output from the apertures has substantially no viewing angle dependence.

The fabrication of the device is also simplified compared to existing technologies, and can be compatible with standard CMOS fabrication technology.

The substrate is preferably metal, and this gives rise to the antenna effect which induces the plasmon resonance. For example, the substrate can have a sliver surface.

An array of apertures will can be considered to be a superposition of multiple arrays of different pitch. The principal wavelength of transmitted light and pitch p between the apertures in the array preferably satisfies:

$$\lambda \cong p \sqrt{\frac{\varepsilon_m \varepsilon_d}{\varepsilon_m + \varepsilon_d}}$$

where $\varepsilon_m$ is the dielectric constant of the substrate and $\varepsilon_d$ is the effective dielectric constant of the material filling the aperture.

By changing the effective dielectric constant of the material filling the aperture, in accordance with the invention, the corresponding wavelength can be shifted to the non-visible spectrum. Thus, the aperture array functions as a switchable colour filter.

The means for varying preferably comprises a phase change material portion, for example a layer of phase change material provided over the substrate. However, other ways of changing the effective dielectric constant can be used, such as a piezoelectric material portion.

The array of pixels can comprise different colour pixels, the pixels of different colours having different pitch between the apertures of the array of apertures of the pixel. For example, the array of pixels can comprise an array of colour pixels, each comprising three sub-pixels of different colours.

Thus, colour sub-pixels can be formed simply as areas with different aperture pitch (and optionally size). However, these different sub-pixels can be formed using the same processing steps—essentially a step of forming holes in the substrate.

The size of the aperture arrays for the three different colour sub-pixels does not need to be the same, so that a desired colour balance can easily be obtained. The sub-pixels can occupy a very dense area, reducing the "bleeding" effects seen on other technologies. The sub-pixel positions can be optimized to a compact area, for example with non-rectangular pixel boundaries.

The invention can be implemented as a low power device.

Examples of the invention will now be described in detail with reference to the accompanying drawings, in which.

The same reference numbers have been used in different figures to denote the same components and layers, and the description is not repeated.

The invention provides a display device in which pixels (or sub-pixels) are formed as sub-wavelength dimension aperture arrays. These have characteristic wavelength-dependent light transmission properties, which properties depend on the dielectric constants of the materials of the structure. Means is provided for varying the effective dielectric constant of the aperture, so that the light transmission characteristics of the pixel can effectively be switched between on and off states.

When light passes through a tiny (sub-wavelength size) hole, Bethe predicted an extinction based on the $4^{th}$ power of the ratio of wavelength to hole size. However, recent experiments have shown that when the hole is made in a metal layer the transmitted intensity increases. This effect is considered to result from an "antenna" effect.

If the material around the hole is a metal, in certain conditions, the incident beam (the electromagnetic wave) will cause oscillations, and a surface wave will propagate through the hole. On other side of the hole this oscillation will "recreate" the light beam. At this point, there will also be diffraction effects, but the filtering comes from the propagation of a surface wave. This phenomenon is called Surface Plasmon Oscillation or Surface Plasmon Resonance (SPR).

In addition to this effect, the transmission (or indeed reflection) is different for different wavelengths.

This colour filtering is used in the device of the invention to enable a colour display structure to be formed.

Figure 1:
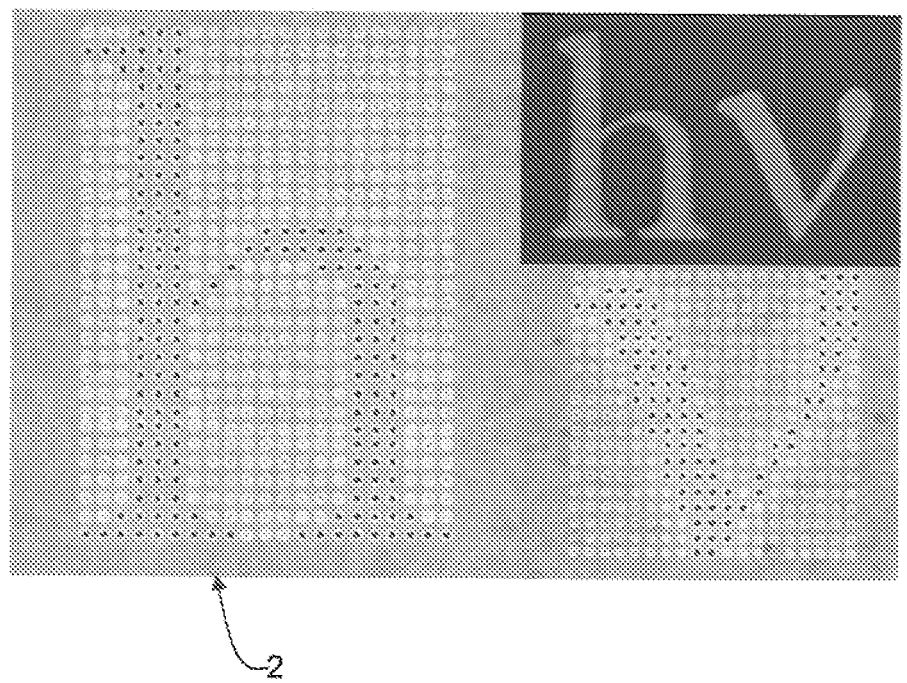
FIG. 1 is used to explain the principle underlying the device of the invention.

FIG. 1 shows an array of dimples formed in a silver film. The dimples are formed by ion-beam milling. Some of the dimples are milled through so that light can be transmitted. The silver film forms a substrate 2.

When the structure is illuminated with white light, the transmitted colour is determined by the period of the array. In this example, the letter "h" is formed with openings having a period (i.e. pitch) 550 nm, and this gives a red colour. The letter "v" is formed with openings having a period (i.e. pitch) 450 nm, and this gives a green colour.

This colour filtering effect can be tuned. When white light passes through an array of sub-wavelength holes, the wavelength corresponding to a maximum intensity can be expressed using formula 1:

$$\lambda\sqrt{i^2+j^2} \cong p\sqrt{\frac{\varepsilon_m\varepsilon_d}{\varepsilon_m+\varepsilon_d}}$$ Formula 1

Formula 1 gives the central frequency ($\lambda$). The hole pitch is p, $\varepsilon_m$ is the dielectric constant of the substrate and $\varepsilon_d$ is the effective dielectric constant of the material filling the aperture.

i and j are the orders of the array. For a square array of period p, a central wavelength will be obtained at the array with the period p, but also for 2p (considering an array made from alternate holes), and for 3p etc. Thus, an array with pitch p can be considered as the superposition of multiple sub-arrays of larger pitch. As the array is 2D, sub-arrays can also be derived with a pitch based on diagonal dimensions from the basic array. As a result, the terms based on i and j values represents the possible pitch dimension for sub arrays that can be considered to be superposed to form the array. However, the main intensity however is for low i and j numbers, (in a similar way to diffraction orders calculations). In general, the values i=1 and j=0 or i=0 and j=1 can be considered, so that the term with i and j can be ignored for the principal wavelength transmitted. In this case:

$$\lambda \cong p\sqrt{\frac{\varepsilon_m\varepsilon_d}{\varepsilon_m+\varepsilon_d}}$$

It can be seen that properties of the metal and of the ambient medium (the dielectric, which could be air) will heavily modify the oscillation properties.

The dielectric material is defined by its dielectric constant $\varepsilon_d$ and the metal is defined by its dielectric constant $\varepsilon_m$. The plasmon resonance depends both on the metal and the dielectric. The dielectric constants for the metal and dielectric are known for all suitable materials and all wavelengths, so that the frequency can be determined for a given material structure.

The influence of the hole size is not reflected in Formula 1. Generally, the holes need to be of sub-wavelength dimensions, or light just directly goes through. A diameter corresponding to at most half of the wavelength of the light to be transmitted is appropriate. When the pitch of the holes has been determined to obtain the desired filtering, the hole size clearly needs to be smaller than that pitch, and preferably smaller than half the pitch.

To tune the filtering in such a way that there is no light transmission, the central frequency $\lambda$ can be shifted to different values, outside the visible range. This can be achieved by tuning the dielectric constant of the metal, the dielectric or both.

As an example, using Al as metal and SiO2 as dielectric, a red array (filtering all but red light at 627 nm) can be formed by an array of holes with pitch 423 nm and hole size 161 nm. The array transmits red light.

For display applications, it is necessary to be able to quickly switch off the transmission (or move the central peak to a different wavelength). One possibility is to perturb the dielectric constant of the dielectric. This can be achieved using a phase change material.

Figure 2:
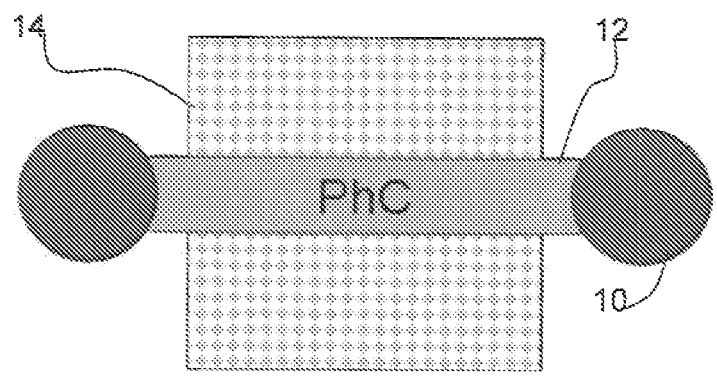
FIG. 2 is used to explain how the device of the invention can be controlled.

FIG. 2 shows contact electrodes 10 on each side of a line 12 of phase change material which is provided on top of the metal hole array 14 of the substrate 2.

Phase change materials are for example chalcogenide alloy of germanium, antimony and tellurium (GeSbTe) called GST. These materials are well known to those skilled in the art.

The introduction of a phase change gives rise to an abrupt change in the dielectric constants, which results in a change in the effect. The array is designed to give the desired light filtering effect, based on Formula 1 with one of the values of phase of the phase change material, and when the phase changes, the effect will be perturbed to give an off state.

The phase change material can be deposited on top of the array as mentioned above, or some holes can be filled with the material. The result is that in one phase, the central wavelength is the desired colour, whereas in the other phase, the dielectric constant change is such that there is no visible wavelength transmitted.

The design and structure can be optimized based on 2 criteria:

In phase A, the dielectric constant of the phase change material must match with dielectric material dielectric constant, or have a minimal impact on it, In phase B, the dielectric constant must be different enough to stop or perturb the plasmon effect.

This optimisation is carried out for red, green and blue arrays, and a full colour display can thus be created using the technology. Each array is then independently driven.

The selective filtering provided by this arrangement can be used in a reflective or transmissive display device. In a transmissive mode, the arrays are designed to transmit a certain wavelength. In a reflection mode, the same arrays can be used, and each array will reflect "all but X" X being red, green or blue.

Thus, in reflection mode, mixed colours are reflected. This will give a different colour gamut to the display device, but colour mixing can still be used based on the reflection from different arrays to provide a colour display function. The mixing of colours is preferably performed with a resolution such that the individual colours are not visible to the naked eye.

Figure 3:
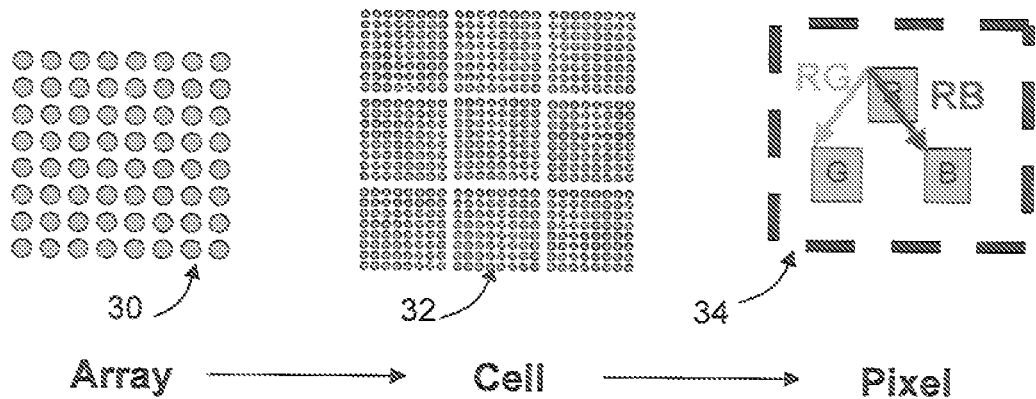
FIG. 3 shows how sub-pixels can be formed of multiple arrays, and how sub-pixels can be combined to form colour pixels.

FIG. 3 shows how a pixel array can be defined. A single array of apertures is shown as 30. A cell can be formed from multiple such arrays, for example a 3×3 arrangement of the arrays as shown as 32. This enables control over the amount of transmission, in that any number 0 to 9 of the arrays within the cell can be made to transmit light of the pixel colour.

An image is made of pixels. Each pixel will have several red, green and blue cells as shown as 34. In the pixel 34, each colour sub-pixel is represented by a square which itself represents one cell, i.e. a set of aperture arrays of the desired pitch. When all pixels are "on", the transmitted (reflected) light is white.

Figure 4:
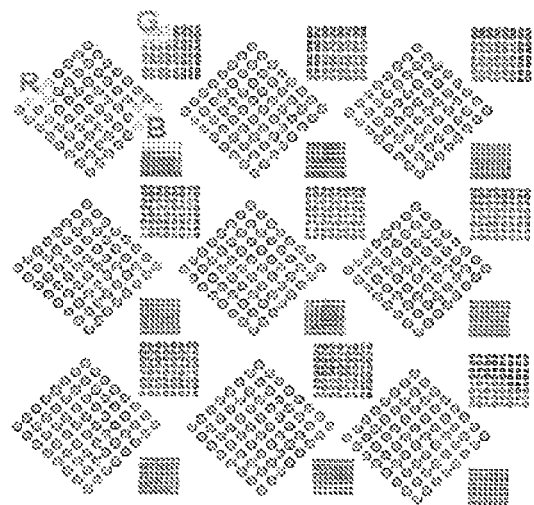
FIG. 4 is used to explain how the pixel layout can be designed in a flexible manner.

The arrays can be placed a way that the vectors between red and green sub-pixels and between the red and blue sub-pixels are less than the cell size. This can be achieved by interleaving the arrays of different colours so that instead of sub pixels occupying separate areas (as shown in FIG. 3), the three sub pixels are all effectively spread across the pixel area (as shown in FIG. 4). This interleaving of arrays provides very efficient colour mixing.

FIG. 4 shows one pixel, and shows the interleaving of the different sub-pixel aperture arrays. As shown, the aperture arrays associated with different colour sub-pixels have different pitch between the apertures (for example the red apertures have a larger pitch). FIG. 4 also shows that the size of the aperture arrays for the three different colour sub-pixels is not the same. The sub-pixels can be combined as efficiently as possible.

The colour depth is defined by the number of distinct colours a display can produce. In the case of the plasmon device each array can produce 2 colours: black and the array colour. If there are N independently controllable arrays of apertures for each sub-pixel colour (R, G, B), the total colour depth of the pixel will be $N^3+1$. Each individual array has a number of apertures sufficient to make the colour filtering effect observable. For example, each array can be as small as 4×4 holes, but more preferably it may be 8×8 holes or more.

If each pixel has 8×8 arrays of apertures, the colour depth is 262, 145 colours. This colour depth is achieved with a binary drive scheme, which therefore simplifies the drive algorithm and control circuitry. The more arrays of apertures per pixel, the greater the colour depth. Thus, the desired colour depth can be obtained simply by defining more aperture arrays per pixel. In this way, a colour depth of billions of colours can be reached, although with larger pixels, and therefore suitable only for a larger device.

Obviously the size of the pixel increases with the amount of holes per array, and the number of arrays per pixel. A small array of 10×10 holes results in a square of approximately 5 micron width (500 nm×10). If a cell has 8×8 such arrays, the cell width is approximately 40 microns. The pixel width may be approximately 60 microns by combining sub-pixels in an efficient way. Thus, a one million colour pixel screen can be obtained with a size of 6 cm×6 cm, or for other aspect ratios, with approximately a 8.5 cm diagonal. A larger screen can use larger pixels, and can therefore have a larger colour depth.

The screen needs three critical parts: current driver (driving the individual arrays), the hole array, and the "phase change" part.

The phase change material can be provided as a continuous layer, with local current injection inducing the local phase change at the location of individual arrays of holes. The phase change effect is a thermal effect, and the techniques for addressing phase change materials are well known from the field of phase change memory devices. The phase change material can be above or below (with respect to the direction of incident light) the array plate. The phase change layer may instead be segmented, with a pad for each array of holes.

For a reflective display, a metal layer can be deposited on top of the driver chips and the phase change deposited on top of the metal. Contacts can then be made on the phase change to the driver layer.

For a transmissive display drivers can be put on the side of the screen and contact lines can extend into the array area.

The detailed implementation will be routine to those skilled in the art of addressing of array devices and the use of phase change materials.

Various modifications will be apparent to those skilled in the art.

The invention claimed is:

1. A display device comprising:
a substrate having a plurality of apertures therein, the substrate having a first effective dielectric constant;
a dielectric material disposed within at least some of the apertures, the dielectric material having an adjustable second effective dielectric constant;
an array of pixels, each pixel comprising an array of corresponding said apertures in the substrate, each aperture of the array having a maximum opening dimension less than a wavelength of light at least one frequency;
a phase change material on top of the substrate configured and arranged to vary the second effective dielectric constant, thereby to vary light transmission characteristics of the array of pixels between transmission of the at least one frequency in the visible spectrum and transmission of substantially no frequency in the visible spectrum, wherein as a result of the varying, the array of pixels transmit the at least one frequency in the visible spectrum through the apertures via surface plasmon oscillation when the first effective dielectric constant is substantially same as the second effective dielectric constant, and the array of pixels reflect the at least one frequency in the visible spectrum by perturbing surface plasmon oscillation in the apertures when the first effective dielectric constant is substantially different from the second effective dielectric constant.

2. A device as claimed in claim 1, wherein the substrate includes metal and the phase change material includes a chalcogenide alloy, wherein the phase change material exhibits the first effective dielectric constant in a first phase and exhibits an effective dielectric constant different from the first effective dielectric constant in a second phase.

3. A device as claimed in claim 2, wherein the substrate has a metal surface and the second effective dielectric constant is variable abruptly from one phase of the phase change material, corresponding to the light transmission of at least one frequency and another phase corresponding to said transmission of substantially no frequency in the visible spectrum.

4. A device as claimed in claim 1, wherein a principal wavelength of transmitted light and a pitch p between the apertures in the array satisfies:

$$\lambda \cong p\sqrt{\frac{\varepsilon_m \varepsilon_d}{\varepsilon_m + \varepsilon_d}}$$

where $\varepsilon_m$ is the dielectric constant of the substrate and $\varepsilon_d$ is the effective dielectric constant of the material filling the aperture.

5. A device as claimed in claim 1, wherein the array of pixels comprises different colour pixels, the pixels of different colours having different pitch between the apertures of the array of apertures of the pixel.

6. A device as claimed in claim 1, wherein the array of pixels comprises an array of colour pixels, each comprising three sub-pixels of different colours.

7. A device as claimed in claim 6, wherein a size of the aperture arrays for the three different colour sub-pixels is not the same.

8. A display device comprising:
a substrate having a plurality of apertures therein;
a dielectric material, including a chalcogenide alloy, disposed within at least some of the plurality of apertures;
an array of pixels, each pixel comprising a plurality of arrays of apertures in the substrate, each aperture of the array of pixels configured and arranged with a maximum opening dimension less than the wavelength of light in the visible spectrum to be transmitted by each aperture;
a member configured and arranged to vary an effective dielectric constant of the dielectric material between a first phase in which the light at the wavelength of light in a visible spectrum can be transmitted through the apertures via surface plasmon oscillation and a second phase in which substantially no frequency in the visible spectrum is transmitted through the apertures due to perturbing surface plasmon oscillation in the apertures, such that each aperture array of each pixel is independently drivable in a binary manner.

9. A device as claimed in claim 8, wherein the substrate is metal.

10. A device as claimed in claim 8, wherein the substrate has a silver surface.

11. A device as claimed in claim 8, wherein a principal wavelength of transmitted light and a pitch p between the plurality of apertures in the array of pixels satisfies:

$$\lambda \cong p \sqrt{\frac{\varepsilon_m \varepsilon_d}{\varepsilon_m + \varepsilon_d}}$$

where $\epsilon_m$ is a dielectric constant of the substrate and $\epsilon_d$ is an effective dielectric constant of the material filling the aperture.

12. A device as claimed in claim 8, wherein the member for varying comprises a phase change material portion.

13. A device as claimed in claim 12, wherein the member for varying comprises a layer of a phase change material provided over the substrate.

14. A device as claimed in claim 8, wherein the member for varying comprises a piezoelectric material portion.

15. A device as claimed in claim 8, wherein the array of pixels comprises different colour pixels, the pixels of different colours having different pitch between the plurality of apertures of the array of apertures of the pixel.

16. A device as claimed in claim 8, wherein the array of pixels comprises an array of colour pixels, each comprising three sub-pixels of different colours.

17. A device as claimed in claim 16, wherein a size of the aperture arrays for the three different colour sub-pixels is not the same.

* * * * *